J. C. JACKSON.
BUMPER AND DRAW HEAD SPRING FOR RAILROAD CARS.

No. 37,448. Patented Jan. 20, 1863.

UNITED STATES PATENT OFFICE.

JOEL C. JACKSON, OF ROCHESTER, NEW YORK.

IMPROVEMENT IN BUMPERS AND DRAW-HEAD SPRINGS FOR RAILROAD-CARS.

Specification forming part of Letters Patent No. 37,448, dated January 20, 1863.

*To all whom it may concern:*

Be it known that I, JOEL C. JACKSON, of Rochester, in the county of Monroe and State of New York, have invented, made, and applied to use a certain new and useful Improvement in Car-Bumpers and Draw-Head Springs; and I do hereby declare the following to be a full, clear, and exact description of the same, reference being had to the annexed drawings, making part of this specification, wherein—

Figure 2:
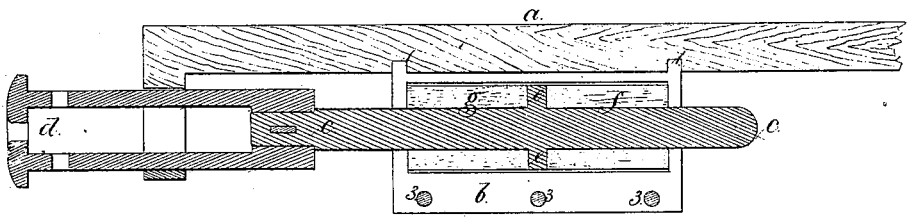
Figure 1:
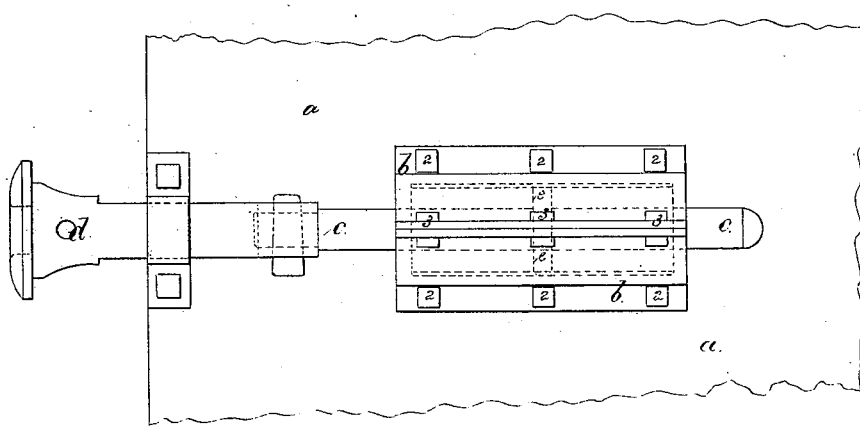

Figure 1 is an inverted plan of my bumper, and Fig. 2 is a section of the same longitudinally.

Similar marks of reference denote the same parts.

The draw-heads of cars are usually provided with springs that prevent sudden concussion in starting the cars, and also act as bumpers when the cars run together. These springs are generally cumbersome and difficult to apply, besides being liable to injury.

The nature of my said invention consists in a draw-bar with a disk formed on or firmly attached near the center thereof, with a rubber spring on each side thereof, in combination with an inclosing draw-box firmly bolted to the platform or sill of the car, whereby little or no slackness or play can arise in use, because the springs are held firmly in place, and there are no bolts or fastenings liable to be loosened by the motion; at the same time sufficient spring exists to relieve the couplings on starting, and to prevent jar to the cars in running together for coupling or in stopping.

In the drawings, $a$ represents a portion of the platform or sill of a car to which the draw-head is connected. $b\ b$ are the halves of the draw-box, made with flanges, by which said box can be bolted, as at 2, to the platform $a$; and ribs 1 1, cast on the upper side of said draft-box and let into the platform or sill, effectually prevents said draft-box moving under the strain to which it is subjected. The halves of the draft-box are bolted together, as at 3 3, and in the interior thereof is a cylindrical or nearly cylindrical cavity containing the springs $f\ g$, that are around the draw-bar $c$, and on each side of the disk $e$, that is firmly attached to or made with the said draft-bar $c$. $d$ is the draw-head of any desired construction, attached to the bar $c$. It will now be seen that when the car is being drawn along, the strain comes on the spring $g$ through the medium of the draw-head $d$, bar $c$, and disk $e$, but said spring, being confined in the draw-box $d$, cannot be broken or injured, and that the spring $f$ takes the concussion of the cars running together. This also being within the draw-box $d$, cannot be injured by the compression to which it is subjected.

My device is simple, strong, durable, and compact, and the rubber springs, being confined, are not liable to be split or injured; neither are there any bolts or nuts on the moving parts that ordinarily work loose.

What I claim, and desire to secure by Letters Patent, is—

The draw-bar $c$ and disk $e$, in combination with the springs $f$ and $g$ and draw-box $b$, for the purposes and as specified.

In witness whereof I have hereunto set my signature this 11th day of December, 1862.

JOEL C. JACKSON.

Witnesses:
   HENRY BELDEN,
   W. P. McKILLIP.